United States Patent [19]
Jeandel

[11] 3,908,359
[45] Sept. 30, 1975

[54] ENGINES AND COMPRESSORS OF THE KIND IN WHICH A VALVE DEVICE ENGAGES WITH A HELICOIDAL ROTOR

[75] Inventor: Ferdinand Jeandel, Paris, France

[73] Assignee: Etablissements Pompes Guinard, France

[22] Filed: Oct. 26, 1973

[21] Appl. No.: 409,782

Related U.S. Application Data

[62] Division of Ser. No. 210,710, Dec. 22, 1971, Pat. No. 3,810,722.

[30] Foreign Application Priority Data
Dec. 16, 1970 France .............................. 70.45340
Nov. 29, 1971 France .............................. 71.42621

[52] U.S. Cl. ............................... 60/39.45; 123/8.47
[51] Int. Cl.² ......................................... F02B 53/00
[58] Field of Search ................... 60/39.45; 123/8.47; 418/195, 197

[56] References Cited
UNITED STATES PATENTS

| | | | |
|---|---|---|---|
| 711,083 | 10/1902 | Taylor | 418/40 |
| 1,735,477 | 11/1929 | Stuart | 123/8.07 |
| 2,500,143 | 3/1950 | Biermann | 418/195 |
| 2,603,412 | 7/1952 | Chilton | 418/195 |
| 2,716,861 | 9/1955 | Goodyear | 418/195 X |

*Primary Examiner*—William L. Freeh
*Assistant Examiner*—Michael Koczo, Jr.
*Attorney, Agent, or Firm*—Robert E. Burns; Emmanuel J. Lobato; Bruce L. Adams

[57] ABSTRACT

The invention relates to a rotary machine which can be used as a motor, a compressor or a motor-compressor or the like. The machine comprises a first and a second body of revolution, one of which is stationary, the other rotating, and at least one helicoidal-spiral groove in the surface of the first body, and at least one valve device with peripheral vanes. The valve device rotates in a longitudinal plane of symmetry of the first body, the vanes engaging in the groove in the first body, the wall of the second body co-operating with the vanes to limit successive chambers of variable volume which change the pressure in a fluid. One of the bodies has at least one part in the form of a projection, also in the form of a body of revolution, the other body having at least one wall part, situated opposite the projection and having a shape complementary to the projection, there being very little clearance between these parts. The shapes of these projecting parts are adapted to modify the flow of fluid through the machine so as to make it agree with the method of functioning of the machine.

7 Claims, 13 Drawing Figures

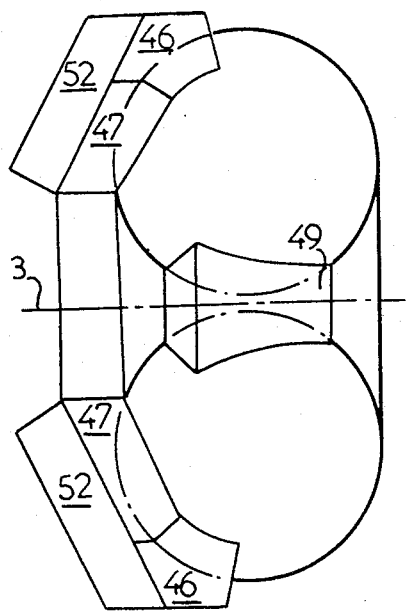
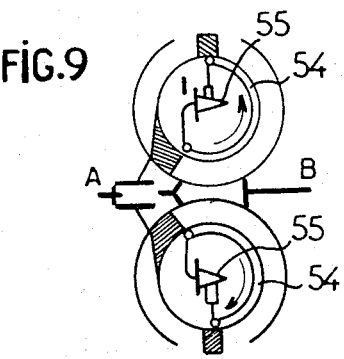
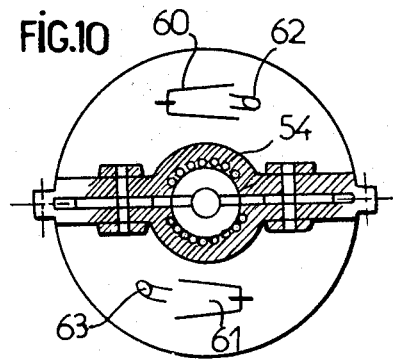
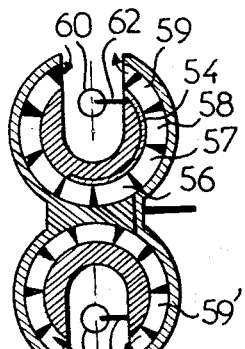
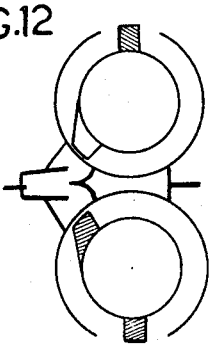
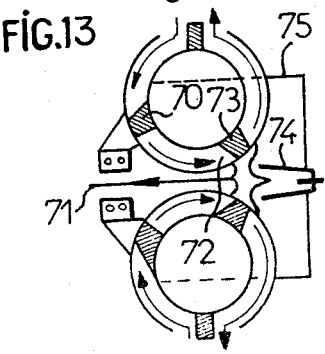
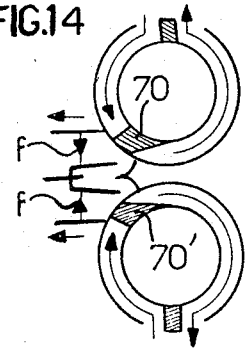
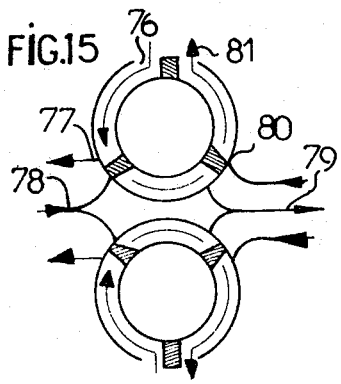

ENGINES AND COMPRESSORS OF THE KIND IN WHICH A VALVE DEVICE ENGAGES WITH A HELICOIDAL ROTOR

This is a division of application Ser. No. 210,710, filed Dec. 22, 1971 and now U.S. Pat. No. 3,810,722.

BACKGROUND OF THE INVENTION

The present invention relates to rotary machines of the kind which can be used as a motor or as a compressor or as a motor-compressor, a machine of this kind having a rotor which rotates inside a stator, in which a fluid is successively compressed and decompressed in chambers of decreasing and increasing volume each chamber being limited by the walls of at least one helicoidal groove in the surface of the rotor, by the surface of the stator and by the surface of at least one valve device with peripheral vanes which engage in the helicoidal groove, the valve device rotating in a longitudinal plane of symmetry of the rotor, the object of the invention being in particular to improve the performance of a machine of this kind, particularly its efficiency and the power delivered, so as to make the machine suitable for a wider variety of applications, compared to the known machines of this kind, and so as to reduce the weight of the machine and its cost of construction.

Machines of this kind are known in which a gas is compressed in a chamber of decreasing volume limited by the surface of an internal stator in the form of a solid torus, by the walls of a helicoidal groove in the surface of a rotor, which completely encloses the internal stator except where the periphery of the stator is joined to an external housing, and by at least one rotary valve device which has projecting vanes which engage in the helicoidal groove. The known device, which is represented diagrammatically in FIGS. 1, 2 and 3, consists essentially of a rotor 2 which rotates about an axis 3 in the direction of the arrow 9. The rotor 2 contains a helicoidal groove between ribs 8 in which engage with close clearances the vanes of two valve devices 4. Each valve device 4 rotates on an axis 5 which extends perpendicular to the axis 3 of the rotor in the longitudinal central plane of symmetry of the latter. The two valve devices 4, in the form of wheels with peripheral vane blades, rotate in a common vertical plane, between the two symmetrical halves of an internal stator 1 in the form of a solid torus. All these parts are contained in the stationary external housing 1'. The internal toroidal stator is attached to the outer housing 1' by an annular bridge which is in the transverse plane of symmetry of the internal stator 1. The vanes 4 project radially outwards beyond the surface 6 of the stator. As already mentioned, the vanes 4 engage in the helicoidal groove of the rotor. FIG. 2 is a transverse section of the machine, taken along the line II — II in FIG. 1. Regarded from this direction the projection of the rib 8 assumes the form of a spiral. FIG. 3 is a 3-dimensional representation of the inside of one half of the rotor, showing a helicoidal rib 8.

Assuming that the rotor is rotating, as indicated by the arrow 9 in FIG. 1, the gas enters through an inlet port 10, entering a helicoidal chamber limited by the first rib 8 of the helicoidal groove in the surface of the rotor 2, by the surface 6 of the solid torus which forms the stator 1, by a vane of the upper valve device and a vane of the lower valve device.

With rotation of the rotor, the stator vanes follow the helicoidal groove in the rotor, progressively reducing the volume of the helicoidal chamber, which is least in the middle region of the device at 12. During this movement the gas in the helicoidal chamber is compressed. In the subsequent phase of the process the gas expands, on its way from the middle region 12 to the outlet port 11. In the case of an internal combustion engine, the combustion mixture entering the engine through the inlet port 10 is compressed, reaching maximal compression at the middle region 12, where it is ignited, subsequently expanding on its way from the middle region 12 to the outlet port 11, this being the working stroke of the engine. On the other hand, if the device is merely a compressor, the device is limited to the part between 10 and 12.

This known device is already approaching the efficiency and power of a conventional motor or compressor. It can be used in the form of an internal combustion engine or a Diesel cycle engine. It can be arranged as a multistage motor comprising several compression stages and several expansion stages, arranged in series or in parallel. Nevertheless the known device has several disadvantages. In particular the power to weight ratio and the thermal efficiency are comparatively low, limiting the field of application. Furthermore the device tends to heat up locally, particularly in the region of the combustion chamber, if the device is in the form of an internal combustion engine with the combustion chamber incorporated in the rotor. The local overheating requires excessive clearances to be provided between the parts of the rotor and the parts of the stator.

SUMMARY OF THE INVENTION

The object of the present invention is to remove these disadvantages by modifying and rearranging the parts of the rotor and of the stator, at the same time taking steps to increase the power to weight ratio and the thermal efficiency of the device.

The machine according to the invention is characterised in that the stator (or the rotor) has at least one projecting body of rotation, the rotor (or the stator) having a corresponding annular recess, there being a very small clearance between the surface of the projection and the surface of the recess, the projection and the recess being arranged so as to modify the flow of the gas through the machine to agree better with the method of functioning of the machine.

BRIEF DESCRIPTION OF THE DRAWINGS

The invention will now be described on the basis of the several examples represented in the drawing, in which:

FIG. 3 represents diagrammatically a machine according to the invention arranged to function as a compressor.

FIGS. 9, 10 and 11 represent another version of the machine of FIG. 4.

FIGS. 12, 13, 14 and, 15, represent diagrammatically several other versions of the machine according to the invention.

DESCRIPTION OF THE PREFERRED EMBODIMENTS

Figure 2:
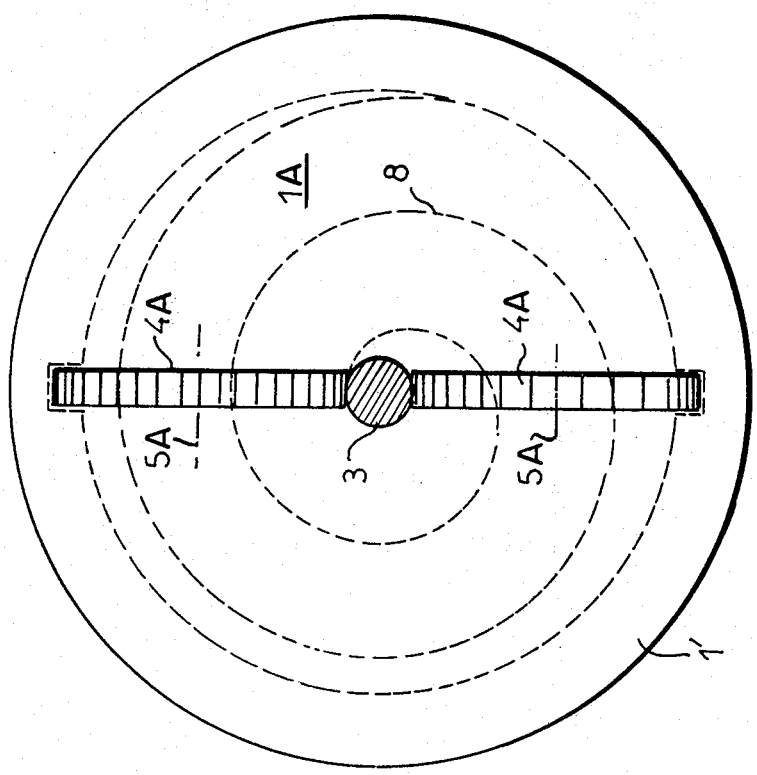
FIGS. 1 and 2, which have been mentioned above, represent diagrammatically an internal combustion engine according to the invention.
Figure 1:
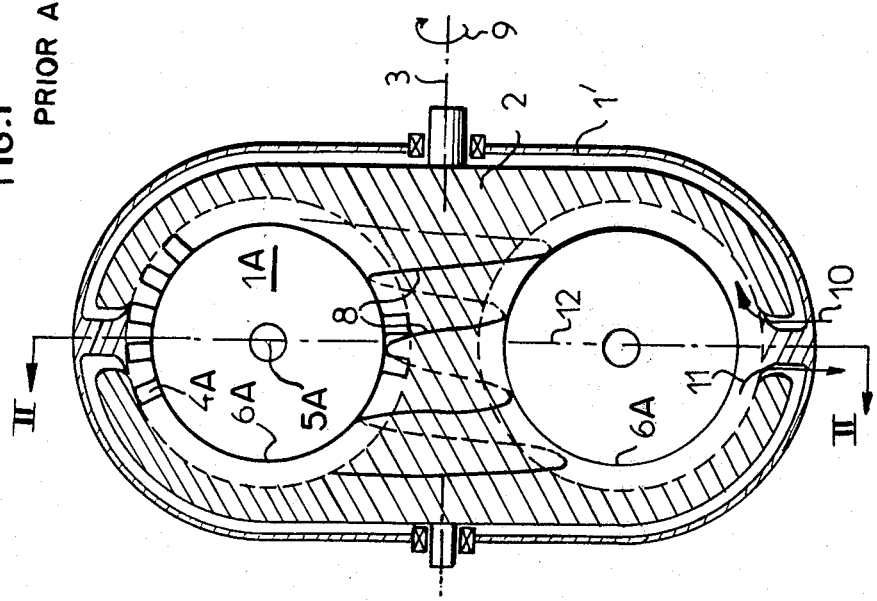
Figure 3:
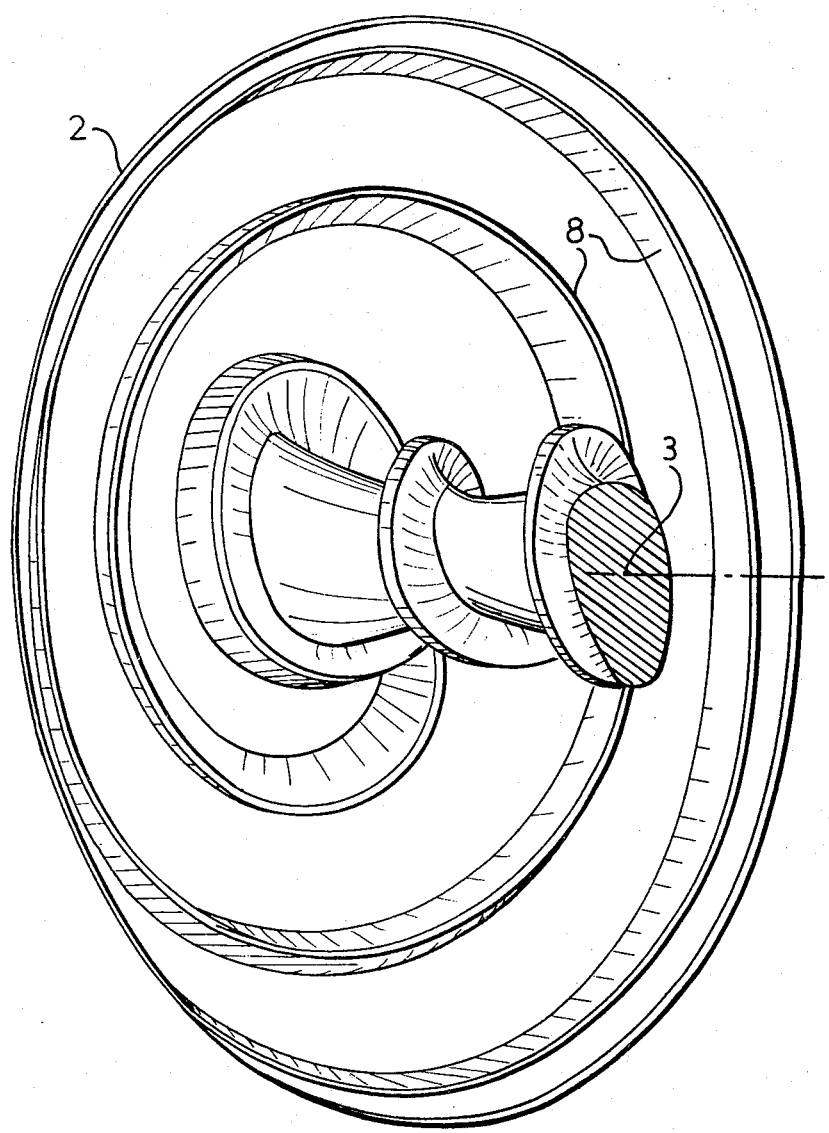
FIG. 3 is a 3-dimensional view of one half of the rotor of the known device represented in FIGS. 1 and 2.
Figure 4:
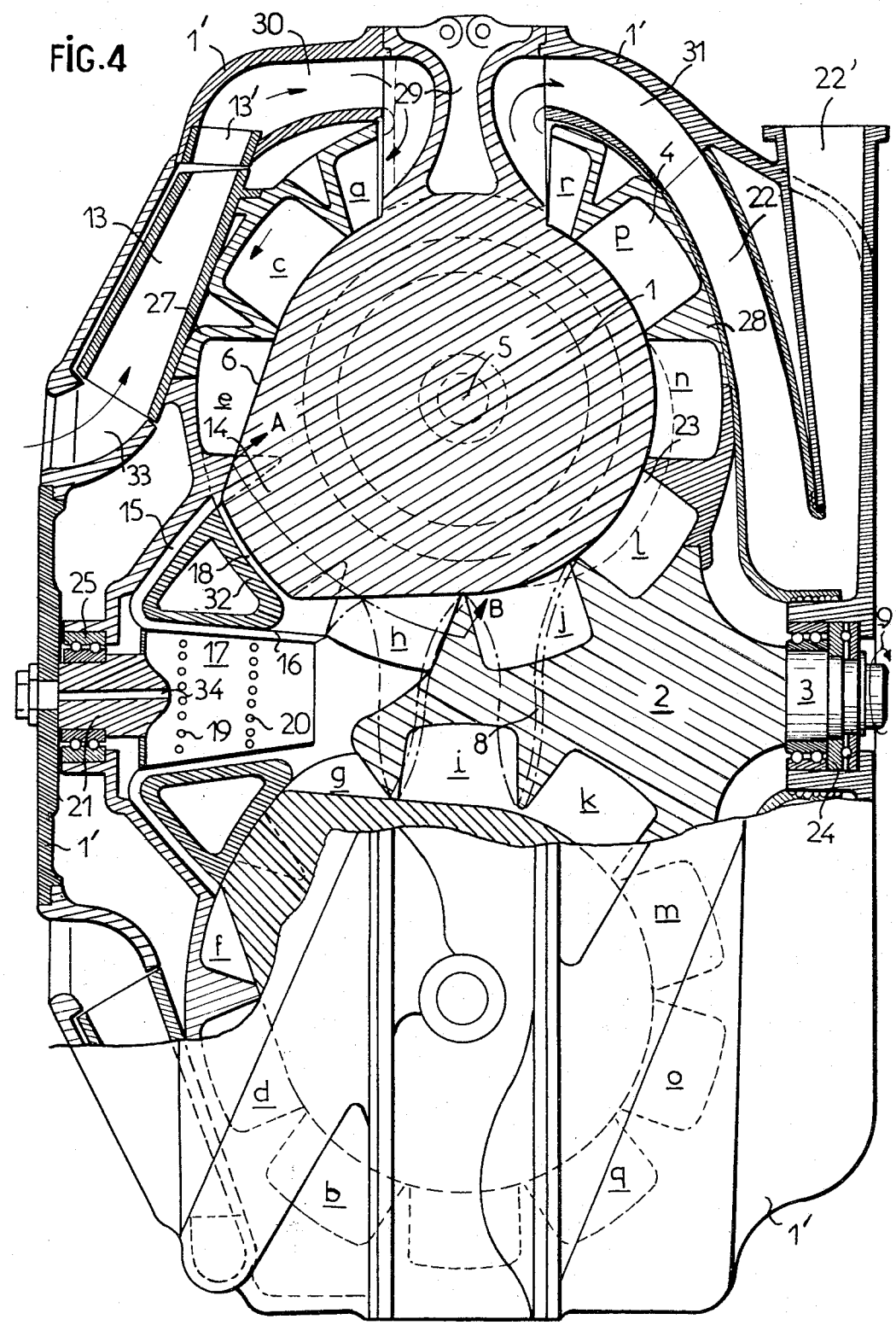
FIG. 4 is an axial section through one version of a machine according to the invention, in the form of an internal combustion engine.
Figure 7:
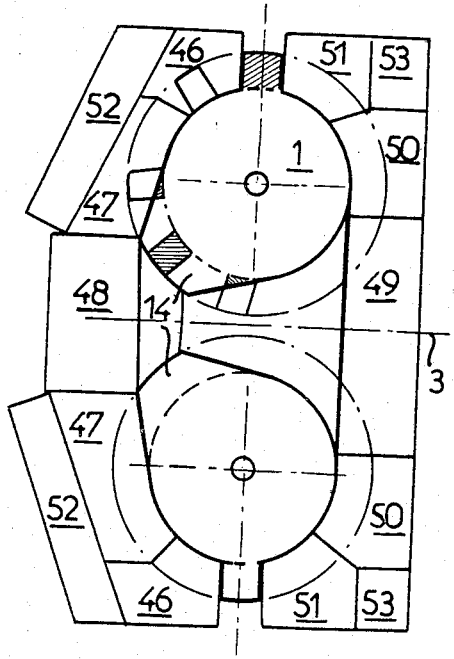
FIG. 7 is a diagrammatical representation of the machine of FIG. 4.

With reference to FIG. 4, this shows a preferred version of the rotary machine according to the invention, in the form of an internal combustion engine equipped with a centrifugal precompressor for the entering gas and a device for recovering the residual energy in the exhaust gases. The machine consists of a rotor 2 whose surface contains a helicoidal groove, the rotor rotating about an axis 3 in the direction of the arrow 9. The rotor shaft rotates in bearings 24, in a stationary outer housing 1'. The rotor has outer hollow toroidal parts 27, 28 which completely enclose an internal solid toroidal stator 1, except where the stator is joined by a peripheral bridge connection 29 to the outer housing 1'. The two outer parts 27, 28 are disposed symmetrically with one another. They jointly define a hollow torus which has a peripheral gap on its transverse plane of symmetry, to give room for the bridge connection 29. The stator 1 is a body of revolution whose axis is the axis of the rotor 2. The toroidal concave inner surface of the rotor, as shown, has a system or ribs 8 thereon, defining a groove therebetween, briefly identified herein as a helicoidal-spiral groove. According to the invention this sytem of ribs 8 covers substantially the entire inner surface of the rotor, except that the ribs 8 are at least partly cut away in one region, as will be described further below. The helocoidal-spiral groove in the two outer parts 27 and 28 is a precise continuation of a helicoidal conical groove in a central part of the rotor 2, so that the inner surface of the rotor, part of which faces the outer surface 6 of the stator 1, contains a continuous helicoidal groove for guiding flowing gases between generally peripheral and generally central locations in housing 1'. In the known device (FIGS. 1–3) the internal stator 1A consisted of two solid half-toruses containing between them the two valve devices 4A, each of which was mounted to rotate on an axis 5A extending between the half-toruses. In the improved machine according to the present invention, on the other hand, the internal stator is a body of revolution in the form of a solid torus. It has a part 14, projecting radially of the generatrix of the body of revolution, the part 14 being of one piece with the solid torus proper and projecting obliquely toward a central region of toroidal rotor part 27, as shown in FIG. 4. The rotor 2 has a part defining an annular recess 32 in said central region, receiving the annular projection 14 on the stator, so that only a very small clearance 18 remains between the projecting and recessed parts 14, 32. The extension and cross section of the annular projection 14, periperally of the generatrix of the torus, is such that it completely covers at least one vane of the rotary valve device 4, as shown in FIGS. 4 and 7. The maximum radial extension of projection 4 substantially equals the depth of the helicoidal-spiralgroove. Accordingly the ribs 8 of the helicoidal-groove in the rotor are entirely removed in the region of the projection 14, and are partly removed on either side of this region. The helicoidal groove is subdivided by the vanes 4 of the valve device into a number of compression chambers of successively decreasing volume $a,b,c,d,e,f$, following one another toward projection 14, and a number of expansion chambers of successively increasing volume $g,h,i,j,k,l,m,n,o,p,q,r$.

The central portion of the rotor, surrounded by the grooved part 27, contains a central chamber 16, which itself contains a combustion chamber 17, a certain amount of clearance remaining between the combustion chamber 17 and the wall of the chamber 16. The combustion chamber 17 is fixed to the outer housing 1' of the machine. The outer housing 1' also contains a centrifugal compressor 13 and a centripetal turbine 22. The rotor of the compressor 13 is fixed to the outer part 27 of the rotor 2, rotating with the latter about the axis 3, inside the outer housing 1'. The centripetal turbine 22 is situated on the opposite side of the machine, compared to the centrifugal compressor 13, that is to say on the opposite side of the transverse plane of the stator 1 and rotor 2. The rotating part of the centripetal turbine 22 is of one piece with the outer part 28 of the rotor 2.

When the motor is in operation, a fluid, for example air or a combustible mixture, enters the engine through an inlet port 33 between central and peripheral parts in the outer housing 1', as shown by the arrow. The fluid is outwardly-spirally propelled by the centrifugal compressor 13, which applies a precompression. Leaving the compressor 13 the air or combustible mixture passes through a diffuser 13', just downstream of the compressor, through passages 30 in the outer housing 1', and through a peripheral connecting passage 29 into the helicoidal groove of the rotor. In the helicoidal groove the fluid is trapped by the vanes of the two valve devices in chambers $a$ to $f$, in which it is progressively compressed. From the chambers $e$ and $f$ the compressed fluid escapes through branch channel 15 and so enters the central chamber 16 which contains the combustion chamber 17. Little or no fluid can escape through the very narrow clearance 18 between the parts 14 and 32. The compressed fluid entering the chamber 16 forms a layer of moving gas around the combustion chamber 17. After entering the chamber 16 the fluid penetrates inwards through a series of openings 19, 20 into the interior of the combustion chamber 17. The combustion chamber is of one piece with a connecting stud 21 fixed to the outer housing 1'. In a different version of the invention the combustion chamber is of one piece with the rotor 2. In the present version the connecting stud 21 contains one or more fuel burners 34.

If desired the amount of clearance 18 between the projection 14 of the stator and the surface of the recess 32 in the rotor can be great enough to allow a certain amount of air to pass through, to act as secondary air, in order to limit the temperature of the impinging burner flame downstream of the combustion chamber 17.

The burnt gases leaving the combustion chamber enter successively the chambers $g,h,i,j,k,l,m,n,o,p,q,r$, in which they expand, finally issuing through the exhaust channel 31. From here the exhaust gases pass through the centripetal turbine 22 in which residual energy is recovered. From the centipetal turbine the exhaust gases issue through a volute 22' situated near the rotor.

In a different version of the invention the toroidal stator 1 has a further convex projection 23, shown in broken lines in FIG. 4. To conform with this projection the ribs 8 of the rotor 2 are partly cut off. The function of the projection 23 is to modify the pressure curve during the working stroke, particularly with a view to producing a smooth pressure curve. In particular it is desirable to balance the pressures acting on the vanes of the valve device. The projection 14, which reduces or entirely covers the surfaces of some of the vanes, gives rise to unbalanced forces acting on the valve device. The second projection 23 reduces this disequilibrium, in addition to influencing the pressure curve during the working stroke.

Figure 5:
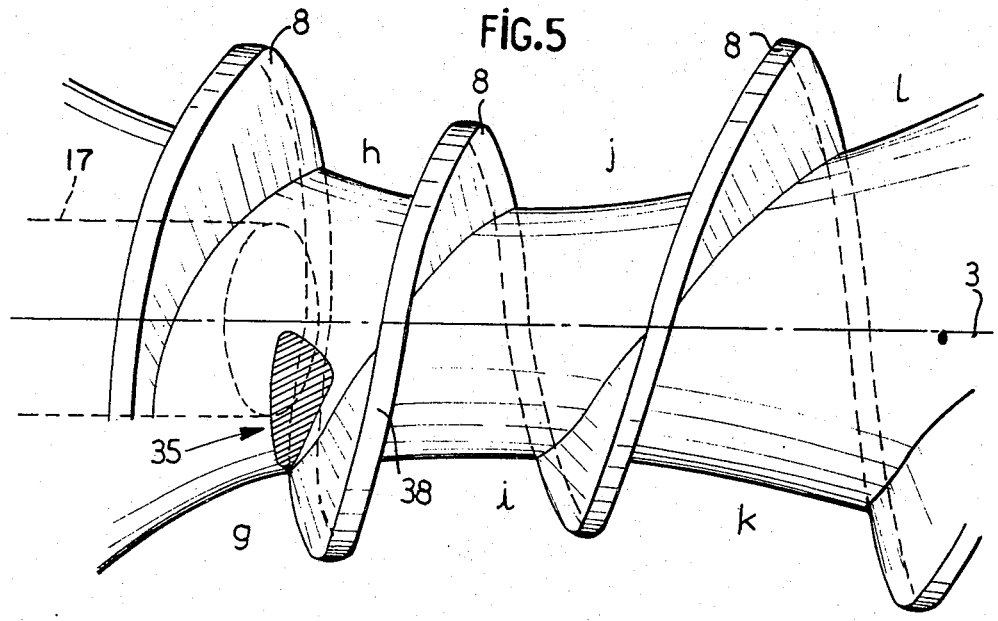
FIGS. 5 and 6 illustrate diagrammatically the path taken by the burnt gases from the combustion chamber into the helicoidal groove in the rotor of the machine of FIG. 4.
Figure 6:
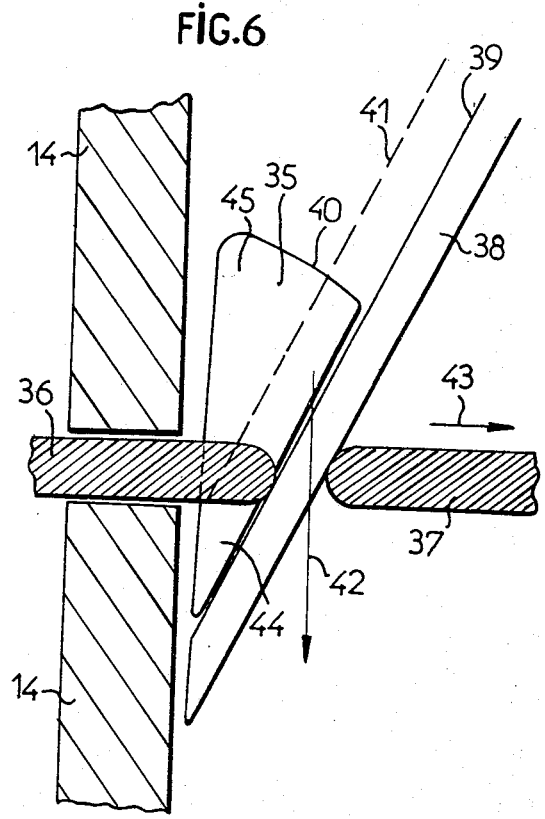

FIG. 5 is a diagrammatic 3-dimensional view of the rotor 2. FIG. 6 is a section taken along the line A–B in FIG. 4. The path taken by burning and burnt gases passing from the combustion chamber 17 into the first helicoidal expansion chamber g will now be described, with the help of these two figures. From the combustion chamber 17 said gases pass through a port 35 in the bottom of the groove in the rotor, between the first two ribs 8 downstream of the combustion chamber. The port 35 is approximately triangular and has walls curved to allow said gases to pass smoothly through without abrupt expansion. Abrupt expansion would reduce the efficiency of the engine. In FIG. 6 two neighbouring vanes of a valve device 4 are shown at 36 and 37, the two vanes enclosing between them a rib 38 which is the first of the ribs 8 situated downstream of the combustion chamber 17. The leading edge of the rib, with reference to the direction of rotation of the rotor, is indicated at 40. The port 35 has its mouth at the base of the rib 38. The direction of rotation of the rotor is indicated by the arrow 42. The direction of rotation of the valve device is indicated by the arrow 43. The rib 38 and the port 35 are shown in the intermediate positions they occupy when burnt gases are flowing into the two helicoidal chambers g and h, on either side of the vane 36. With the rib 38 in the position shown, the burnt gases enter the helicoidal chambers 44 and 45, the chamber 44 being limited by the surface 39 of the rib, the vane 36 and the part 14 of the stator. On the other hand, when the edge 39 of the rib 38 is in the position 41 represented by the broken line, no gases can enter the helicoidal chamber 44. With rotation of the rotor in the direction of the arrow 42, gases increasingly enter the chamber 44, the flow of gases into the chamber 45 decreasing, until the trailing edge 40 of the port 35 reaches the vane 36. In order to prevent an abrupt shut off of the gas flow, which would produce an impact effect, the trailing edge 40 of the port 35 forms an angle with the plane of the valve device. This produces a gradual shutting of the port.

FIG. 7 represents diagrammatically the machine of FIG. 4, to indicate in a general way the different parts of the rotor. The rotor consists of several parts assembled coaxially to facilitate machining operations and the assembling and dismantling of the rotor, and so as to allow the best material of construction to be used for each part. Two parts 46 and 47 serve for volumetric compression. One part 48 is for deflecting the compressed fluid towards the combustion chamber. The three parts 49, 50, 51 are for expansion of the burnt gas. Upstream of the part 46, where the first compression takes place, there is a part 52 which serves for centrifugal precompression. Downstream of the part 52, in which the last expansion takes place, there is a second turbine 53 for recovery of residual energy.

FIG. 8 represents diagrammatically a machine according to the invention intended for use as a compressor. Some of its parts correspond to parts in FIG. 7, but the parts 50, 51, 53 are missing in FIG. 8, and the part 49 necessarily has a different shape.

In another version of the invention, represented in FIGS. 9, 10 and 11, the device contains a bundle of contiguous tubes through which water circulates, for limiting the temperature in the region of the chambers g and h (compare FIG. 4), and two afterburner chambers for improving the thermal efficiency. FIG. 9 is a diagrammatical representation of the machine shown in FIG. 4. FIG. 11 is an axial section taken along the line A–B in FIG. 9. FIG. 10 is an end view of the machine of FIG. 9. The stator 1 contains a bundle of contiguous tubes 54 arranged as a layer near the surface of the stator and in contact with the expansion chambers 56, 57, 58, 59. The water circulates in the directions of the arrows, propelled by pumps 55 which are driven by the axles of the valve devices. This arrangement has the result that the heat removed from the combustion gases in the region of the first expansion chambers just downstream of the combustion chamber is transferred to the region of the chambers further downstream, reheating the expanding gases. Furthermore, there are two afterburner chambers at the locations 60 and 61, the burnt gases passing into the chambers 59 and 59' through elbow ducts 62 and 63. The two chambers 59 and 59' are for example the stages n.o.p.q of the machine of FIG. 4. Fuel is fed in at the center of the machine, air being bled off from the region of highest compression and fed into the two combustion chambers 59 and 59'.

FIGS. 12 to 15 show diagrammatically various other versions of the machine according to the invention, each figure being a vertical axial section. In these greatly simplified figures the projections on the stator 1 are represented in section by hatched areas in the drawings.

FIG. 12 represents a motor, essentially similar to the motor of FIG. 4, but in which the compressed gases are deflected only partly towards the combusion chamber, that is to say there is a considerable gap 18 between the parts 14 and 32 in FIG. 4, so that a considerable flow of secondary air passes between these parts.

FIG. 13 represents diagrammatically an internal combustion motor-compressor in which the air is cooled during compression. A deflector 70 deflects the air through an external cooling circuit 71, from which the air returns and flows again through the part of the machine downstream of the deflector 70, as represented by the arrows. Finally the air is deflected by a deflector 73, which acts as a separating wall between the compressor and the motor parts of the device. Final compression takes place in the region 72. The combustion chamber is shown at 74, for the motor half of the device, the feed of compressed air being indicated at 75.

FIG. 14 shows diagrammatically a motor-compressor which has no cooling arrangements. The air is compressed progressively until it is totally deflected by a deflector 70. Part of the air is bled off and fed to the combustion chamber for the motor half of the machine. The bled off air is fed to the combustion chamber as indicated by the arrows f. The burnt mixture enters the central part of the machine and expands to give the working stroke.

The device in FIG. 15 is a motor-compressor which allows two different fluids to be compressed simultaneously. The part of the device between 80 and 81 is a steam engine, the steam entering at 80 and escaping at 81. A first fluid enters at 76 and, after progressive compression, escapes at 77, where it is totally deflected, as already described above.

A second fluid enters at 78, entering between the stator and the rotor at the other side of the deflector 78. After compression this fluid escapes at 79, being totally deflected by a deflector arranged between this compressor and the steam engine part of the device.

What I claim is:

1. Rotary machine which can be used as one of a motor, a motor-compressor and the like, comprising;

a first and a second body of revolution, one of which is stationary, the other rotatory, the first body of revolution being hollow with an axial central part defining the axis of the machine and the second body being solid and completely surrounded by the said first body; at least one helicoidal-spiral groove in the surface of the first body;

at least one valve device with peripheral vanes rotatable in a longitudinal plane of symmetry of the first body, the vanes engaging in the groove in the first body, the wall of the second body co-operating with the vanes to limit succesive chambers of variable volume for changing pressure in a mixture of compressed fluid with injected fuel, a combustion chamber for burning the said mixture, the second body having at least one projecting part, also in form of a body of revolution, the said first body, the surface of which is provided with the said helicoidal-spiral groove, having at least one wall part, obtained by a complete truncature of the ribs of the helicoidal-spiral groove in the region facing said projecting part and having a shape complementary thereto, there being very little clearance between these parts, the machine comprising also channel means provided in the said first body, having a reduced cross-section and being located in the machine so as to conduct the fluid from the end of the helicoidal-spiral groove, situated above the said projecting part in the direction of flow of the circulating fluid, through the said combustion chamber to the part of the helicoidal-spiral groove situated below the said projecting part;

the said projecting part of the second body and the said completely truncated part of the first body and directing the fluid into the said channel means in such a manner that the fluid is subjected to an additional greater compression upstream of the combustion chamber.

2. Machine according to claim 1, for use as a motor, in which the first body is the rotor, the second being the stator, the machine having a centripetal turbine for recovering the residual energy, a recuperative volute fixed to the stator, and an outlet port for the fluid, the outlet port being situated at the peripheries of the stator and rotor, the rotating part of the turbine being fixed to the rotor and situated in the path of the fluid leaving the last expansion chamber of the rotor through the port, the outlet of the turbine being situated near the longitudinal axis of rotation of the machine, in the recuperative volute.

3. A rotary machine comprising;

a housing having an axis;

a stator body and a rotor body, both disposed in said housing, both being bodies of revolution about said axis, one of said bodies being hollow, having an inner surface disposed about said axis and having ribs thereon defining at least one helicoidal groove in said inner surface, the other body being solid and being surrounded coaxially by said one hollow body;

a combustion chamber in said housing; means for introducing fuel into said chamber;

means for introducing fluid into said housing;

the rotor body having an axial end, compressor means for circulating the introduced fluid in said housing between said bodies and through said combustion chamber, for mixing the circulating fluid with the fuel and means for burning the resulting mixture to rotate the rotor body; and deflectors for deflecting the compressed fluid towards the combustion chamber; the combustion chamber, the compressor means and the deflectors being contained in said axial end of the rotor body;

valve means disposed in said housing in a plane of symmetry of said bodies which plane is longitudinal of said axis, said valve means having peripheral vanes and being rotatable in said plane by engagement of the vanes with said ribs of said one hollow body; and means defining an outer surface portion of the other solid body for cooperating with said vanes to cooperate with said vanes in defining successive compression chambers of different respective volumes in said housing to compress said mixture circulated by said turbine; said outer surface portion having at least one part thereof projecting therefrom outwardly of said solid body and constituting a body of revolution about said axis; said hollow body having at least one inner annular surface portion recessed into and truncating said ribs to provide space for said projecting part, said outer and inner surface portions having a close fit therebetween.

4. A machine according to claim 3, in which the deflectors comprise channel means connecting a last one of said compression chambers, upstream of the projecting part in the circulation of said fluid, with the combustion chamber.

5. A machine according to claim 4 in which the helicoidal ribs are recessed opposite said projecting part so that edges of the ribs conform to the entire surface of the projecting part, leaving only a small clearance between said edges and said surface.

6. A rotary machine, comprising;

a housing having an axis;

a stator body and a rotor body, both disposed in said housing, both being bodies of revolution about said axis, one of said bodies being hollow, having an inner surface disposed about said axis and having ribs thereon defining at least one helicoidal groove in said inner surface, the other body being solid and being surrounded coaxially by said one hollow body;

a combustion chamber in said housing;

means for introducing fluid into said housing for circulation therein between said bodies and through said combustion chamber and for mixing the circulated fluid with fuel and burning the resulting mixture to rotate the rotor body;

valve means disposed in said housing in a plane of symmetry of said bodies which plane is longitudinal of said axis, said valve means having peripheral vanes and being rotatable in said plane by engagement of the vanes with said ribs of said one hollow body; and means defining an outer surface portion of the other solid body for cooperating with said vanes to define successive compression chambers of different respective volumes in said housing to compress said mixture; said outer surface portion having at least one part thereof projecting therefrom outwardly of said solid body and constituting a body of revolution about said axis; said hollow body having at least one inner annular surface portion recessed into and truncating said ribs to provide space for said projecting part, said outer and inner surface portions having a close fit therebetween, whereby they substantially prevent passage of the circulating fluid therebetween thus providing for additional compression of the mixture.

7. A machine according to claim 6 including afterburner chamber means in said housing, for receiving fuel, only partly burned, from said helicoidal groove and for burning it.

* * * * *